April 29, 1969    E. J. HERBENAR ET AL    3,441,298
PURGIBLE SEAL ASSEMBLY
Filed March 7, 1966
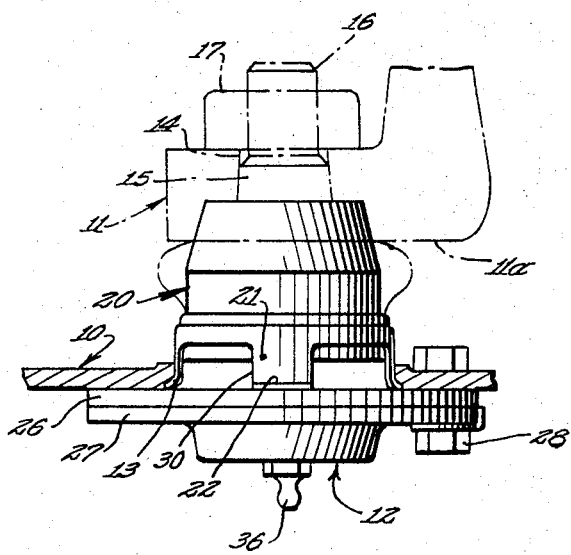
INVENTORS
Edward J. Herbenar
Sylvester S. Mazur
BY Hill, Sherman, Meroni, Gross & Simpson
ATTORNEYS

United States Patent Office 3,441,298
Patented Apr. 29, 1969

3,441,298
PURGIBLE SEAL ASSEMBLY
Edward J. Herbenar and Sylvester S. Mazur, Detroit, Mich., assignors to TRW Inc., Cleveland, Ohio, a corporation of Ohio
Filed Mar. 7, 1966, Ser. No. 532,329
Int. Cl. F16b 7/02; B25g 3/36
U.S. Cl. 287—87                4 Claims The present invention relates to ball joint assemblies and is, more particularly, concerned with the provision of a novel, simplified, combination ball joint and seal construction constructed to permit complete assembly of the ball joint with its seal prior to installation and at the same time provide means for relieving internal high pressure grease conditions. As those skilled in the art of ball joints, and particularly, the art of automotive ball joints are aware, it is common practice to provide grease seals and grease fittings on ball joints employed in the suspension of automobile passenger cars and trucks. In spite of the fact that modern plastic materials have substantially improved anti-friction characteristics in their own right, it has been found that the application of some grease or other lubricant to the ball of the ball joint provides a very materially greater satisfactory operating life. It is, accordingly, desirable that means be provided for applying grease to the internal cavities of the ball joint while at the same time sealing the joint against the ingress of foreign particles and permitting the relief of excess pressures that occasionally develop within the joint during the application of grease thereto.

In accordance with the present invention, a novel joint and support relationship is provided incorporating the securement of grease seal means without requiring additional attachment structure for the joint seal. Further, the seal is provided with at least one, and preferably a plurality of, check valve portions operable to permit the passage of grease from a position internal of the joint and seal combination to the exterior thereof. In providing such a grease relief valve system, it is desirable that the sealing functions be accomplished at a minimal expense and that the assembly of the ball joint and seal combination be maintained at a simple level such that the seal may be incorporated at a nominal cost in time and labor. In the present invention, the ball joint is provided with an external seal tightly and sealingly engaging the stud shank of a ball joint. The other end of the seal is positively secured at portions along its periphery to the ball joint housing and the portions between secured areas are constructed to provide a check valve action, particularly during positive pressure greasing operations. In accordance with the embodiment of the invention to be illustrated herein, the portions of seal securement are rigidly attached to the support means for the ball joint housing in a simple and inexpensive means eliminating the use of any conventional fastenings. Further, in accordance with the embodiment illustrated, the seal assembly may be installed upon the ball joint and its housing as a sub-assembly prior to insertion into a final assembled relationship with parts to be pivotally interconnected. As a result, storage of the ball joint housing, with its seal, is possible without fear of foreign matter contaminating the seal joint during its storage.

It is, accordingly, an object of the present invention to provide a new and improved ball joint assembly and seal therefor.

Another object of the present invention is to provide an interconnected seal and ball joint housing mount.

A feature of the invention resides in the provision of a combination metal and resilient seal providing the two-fold action of sealing and check valve operation.

A further feature of the invention resides in the provision of a ball joint housing and attachment means in which a portion only of the housing, carrying the seal, is arranged to project through the ball joint support.

Still a further object of the present invention is to provide a purgible seal capable of relieving grease pressures built up in the interior of a ball joint assembly or the like.

Still other and further objects and features of the present invention will at once become apparent from a consideration of the attached drawings wherein a preferred embodiment of the present invention is shown, by way of illustration only, and wherein:

FIGURE 1 is a side-elevational view of the ball joint and seal structure of the present invention;

FIGURE 2 is an enlarged detail view, in cross-section, of an elevational portion of the construction shown in FIGURE 1;

FIGURE 3 is an enlarged, partial view of the construction as shown in FIGURE 2 illustrating the manner of grease purging action; and FIGURE 4 is a generally isometric view showing the resilient seal member per se and more clearly illustrating the grease-purging check valve portions thereof.

As shown on the drawings:

The seal construction may be clearly understood from a consideration of FIGURES 1 through 4. As there shown, a pair of members 10 and 11 are shown connected by a ball joint generally indicated at 12. The members 10 and 11 may, in accordance with the illustrated embodiment, comprise suspension components of an automotive vehicle or the like. Thus, in such an arrangement, the parts 10 may comprise a lower control arm of an independently sprung front wheel suspension system while the part 11 may comprise the wheel spindle support which is to be universally articulated to, and carried by, the control arm.

In the embodiment illustrated, the spindle 11 is provided with a tapered aperture 14 for co-operation with the ball joint stud 15. The stud 15 is conventionally threaded as at 16 so that it may be wedgingly secured in the aperture 14 by means of a conventional threaded nut 17.

A resilient seal, generally indicated at 20, seats against the lower surface 11a of the spindle 11 and is snugly drawn into contact therewith upon tightening of the nut 17. As may clearly be seen from a consideration of FIGURE 1, the seal 20 is surrounded by an annular securing ring 21. The ring 21 has an outside diameter slightly smaller than the inside diameter of aperture 13 of the member 10, and is outwardly flared at 22 to an extent preventing its passage through the aperture 13. The ring 21 has, at its uppermost end, a radially inturned flange 23 which co-operates with an annular groove 24 in the seal 20 to prevent relative longitudinal movement between the ring 21 and the seal 20. At the lower portion of the ring, the internally facing surface 22a engages against the outside surface 25 of the ball joint housing portion 26 so that radial inward deflection of the ring 21, away from its interference contact with the peripheral edge of the aperture 13, is prevented. As a result of the construction, the securement of the ball joint housing portions 26, 27 to the control arm or similar part 10 by means of a fastener 28, or the like, positively retains the ring 21 in fixed, assembled relationship. Similarly, the fixation of the ring 21 relative to the arm 10 positively fixes the lower end of the seal 20 relative to the ball joint housing portion 26 and provides, in co-operation with the surface 25 thereof, a tight seal. This seal relationship is clearly shown in the enlarged segmental view of FIGURE 2.

It will be understood from the above description, that the seal 20 may be assembled onto the external surface of the ball joint stud and housing in a subassembly relationship. In that relationship, the lower portions 21a of the ring 21 are in generally frictional engagement with the surface 25 of the ball joint housing, thereby remaining in position on the joint assembly while it is in storage and prior to assembly. The joint may readily be assembled to the control arm without disturbing the seal relationship and, upon insertion of the joint subassembly through the aperture 13 of the part 10 in an upward direction as viewed in FIGURE 1, the seal is rigidly locked into position simultaneously with securement of the joint by the fasteners 28. Thus the external seal 20 of the present invention may actually be assembled to the ball joint prior to assembly of the joint with the control arm or the like. This simplifies assembly and permits complete pregreasing of the joint components prior to storage and assembly without danger of grease loss or contamination of the parts during the assembly operation. The packaging and handling of joint and seal subassemblies for replacement, as well as original installations is, thus accordingly greatly simplified and reduced in cost.

It will, of course, be appreciated that the ring 21 may be continuous in its configuration. However, as above noted, in the embodiment illustrated, the ring 21 is scalloped to provide a plurality, four in number, of downwardly projecting portions 21a with relieved portions 30. The seal 20 is provided with a plurality, in the present instance, four, channels clearly seen at 31 in FIGURES 3 and 4. The channels 31 are preferably aligned with the scalloped cut-outs 30 of the ring 21 and the lower annular lip 32 of the seal 20 continuously peripherally engages the surface 25 of the housing 26. Due to the scallops 30 of the ring 21, radially outward movement of the lip 32 is permitted in the scalloped area. This relationship is clearly shown in FIGURE 3 where the lip 32 is shown, in the dotted line position, radially outwardly deflected to permit the passage of grease or the like in the direction of the arrows 34 from the interior area 33 within the confines of the seal 20, to the exterior thereof. However, due to the annular recess 31a circumferentially encircling the surface 25, grease may pass via channels 31, 31a to an area of the seal facing the scallop 30 between portions 21a for relief. Accordingly, it is unnecessary to provide during assembly for alignment of the portion 21a between channels 31. A simple check valve is, accordingly, provided for the relief of grease under pressure from the interior area 33 to the atmosphere outside of the joint. This check valve area is limited to the relieved portions 31 since in the remaining portions of the periphery of the lip 32, the downwardly extending projections 21a of the ring force the lip 32 snugly against the housing surface 25. With this arrangement, the area of check valve relief may be controlled by the number of scallops 30 provided in the ring 21.

Various techniques of rigidification may be employed for providing a tight seal between the seal 20 and the stud shank 15. In the embodiment illustrated, an annular metallic ring may be embedded in the seal, as shown at 36 in FIGURE 4. This provides a tight, and preferably water-tight, connection between the seal and the stud shank such that the only interconnection between atmosphere and the interior of the ball joint is via the check valve passageways 31.

It will thus be seen that we have provided a simple, and yet highly effective ball joint and seal construction which simplifies assembly procedures and, at the same time, provides an efficient purging seal relationship that prevents damage to the seal during the greasing of the joint.

It will be apparent to those skilled in the art that the specific internal configuration of the ball joint is immaterial to utilization of the invention, and, accordingly, it is our intention that the invention not be limited to any such configuration. In the embodiment shown, the stud 15 carries a segmental spherical head 15a spring-pressed upwardly by ball seat 15b and spring 15c. Similarly, various means may be applied for the greasing of the joint such as for example, the grease nipple 36, but no limitation on the invention is intended, as a result of the illustration of the particular joint or nipple form shown. Since variations may be made without departing from the novel concepts of our invention, it is our intent that the invention be limited solely by the scope of the hereinafter appended claims.

We claim as our invention:

1. In combination in a ball joint assembly for the pivotal interconnection of two members, each having an aperture therein, a stud for securement in the aperture of one of said members and having a head portion thereon, a housing surrounding said head portion and having a portion thereof passing through the aperture in the second member and a further portion unable to pass through said last-named aperture, a resilient seal surrounding said first portion of said housing and said stud, means for tightly securing said seal to said stud adjacent said first member and providing a grease-tight seal therearound, and annular retainer ring means surrounding said seal adjacent said first portion of the housing and passing through said aperture in said second member, said retainer ring means having securing means for holding said retainer ring means in said aperture and having further securing means for preventing movement of said seal relative to said ring.

2. The construction set forth in claim 1 wherein said retainer ring is provided with a recess exposing at least one portion of the edge of said seal surrounded thereby, and said seal having a relief channel aligned with said recess and extending from a portion of said seal immediately adjacent to, but slightly spaced from, the said edge of said seal to the interior of said joint whereby pressure within the interior of said joint may force grease through said channel to the edge of said seal located at the recess in said ring whereby said edge will yield to said pressure and pass said grease through said recess.

3. The construction set forth in claim 1 wherein the aperture in said second member, said ring, said seal, and the peripheral surface of said housing are all circular and in nested relation with each other.

4. The structure set forth in claim 2 wherein the aperture in said second member, said ring, said seal, and the peripheral surface of said housing are all circular and in nested relation with each other.

References Cited

UNITED STATES PATENTS

| 3,175,834 | 3/1965 | Wallace et al. _____ 287—87 XR |
| 3,262,706 | 7/1966 | Hassan. |
| 3,248,955 | 5/1966 | Templeton. |

CARL W. TOMLIN, *Primary Examiner.*

ANDREW V. KUNDRAT, *Assistant Examiner.*

U.S. Cl. X.R.

277—212